United States Patent
Basile et al.

[15] 3,659,543
[45] May 2, 1972

[54] SHIP FOR TRANSPORTING CRYOGENIC MATERIAL

[72] Inventors: Norman K. Basile, Hauppauge, L. I.; Joseph J. Cuneo, Scarsdale, both of N.Y.

[73] Assignee: John J. McMullen Associates, Inc., New York, N.Y.

[22] Filed: Apr. 4, 1969

[21] Appl. No.: 813,669

[52] U.S. Cl. .................................. 114/74, 220/9, 220/15
[51] Int. Cl. ................................. B63b 25/08, B65d 25/00
[58] Field of Search ...................... 114/74, 74 A; 220/9 A, 15

[56] References Cited

UNITED STATES PATENTS

| | | | |
|---|---|---|---|
| 3,021,808 | 2/1962 | Henry | 114/74 A |
| 3,319,430 | 5/1967 | Small | 220/9 A X |
| 3,319,431 | 5/1967 | Clarke et al. | 220/9 A X |
| 3,347,402 | 10/1967 | Forman et al. | 114/74 A X |

*Primary Examiner*—Trygve M. Blix
*Attorney*—Fleit, Gipple & Jacobson

[57] ABSTRACT

A ship of simplified construction is adapted for the marine transportation of cryogenic material. At least one single barrier containment tank is located within the hull of the ship. On the inboard side of the inner hull and transverse bulkheads of the ship is provided a thermal insulating system, and covering the inner surface of this insulating system is a gas and liquid impervious liner. A space is provided between the liner and the wall of each containment tank and a cofferdam is provided outboard of the inner hull, outboard of the inner bottom and between the transverse bulkheads. Two circulation systems are provided, the first being provided in the space intermediate the liner and the tank, and the second being provided in the space defined by the cofferdam. Means for the detection of leaks in the containment system are also provided.

11 Claims, 2 Drawing Figures

INVENTORS
Norman K. Basile
Joseph J. Cuneo
BY Stevens, Davis, Miller & Mosher
ATTORNEYS

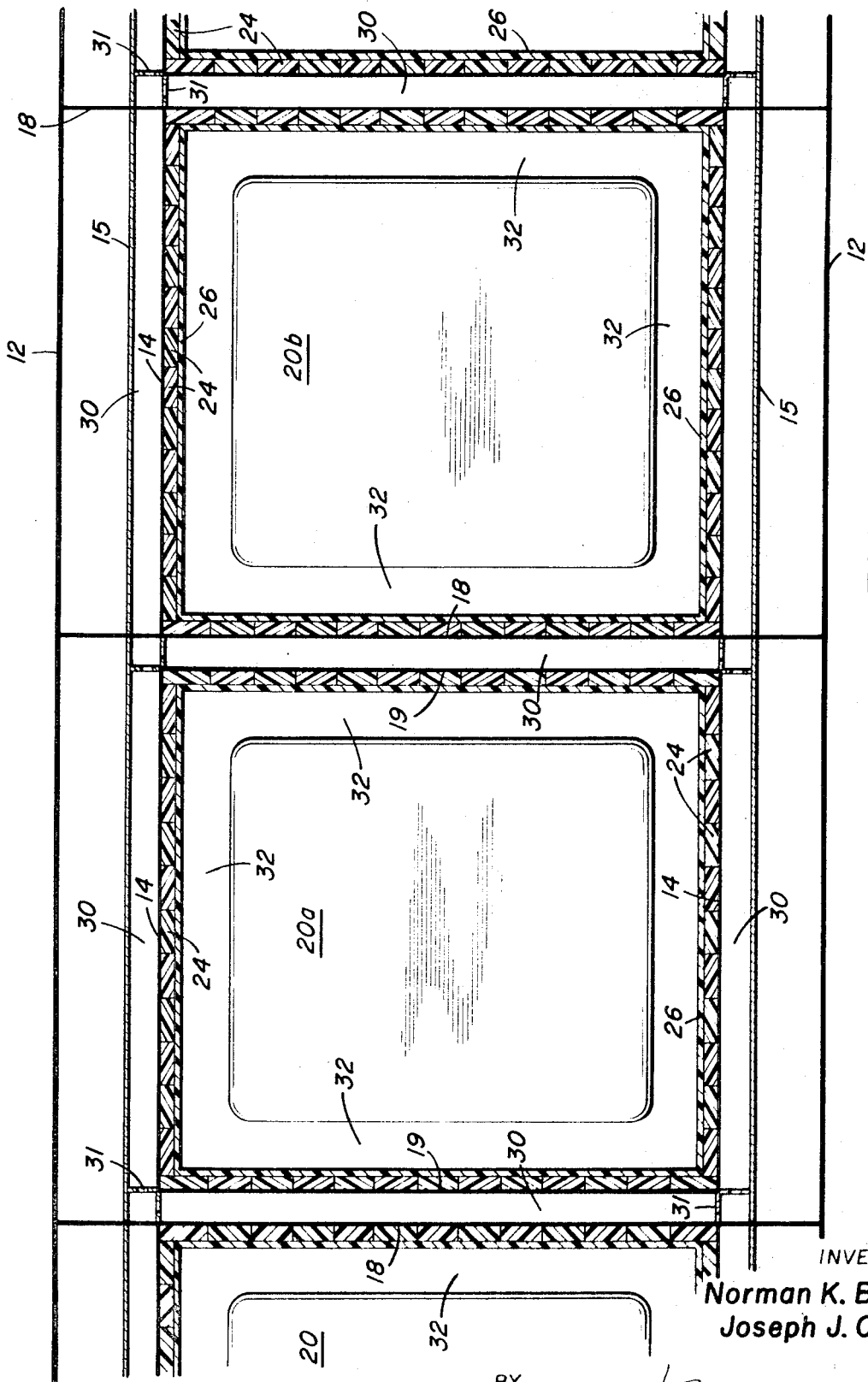

SHIP FOR TRANSPORTING CRYOGENIC MATERIAL

BACKGROUND OF THE INVENTION

The transportation of liquefied materials at cryogenic temperatures (of the order of −250° F.) by means of oceangoing vessels is not new. However, there are numerous drawbacks which have customarily presented themselves.

Cargo ships are generally equipped with containment tanks of the double barrier variety. These tanks are provided in order to protect the hulls of the ships, customarily made of carbon steel which is relatively weak at extremely low temperatures, from the cryogenic materials transported. These tanks are generally constructed of nickel-steel or aluminum alloys to ensure strength at cryogenic temperatures. The two basic drawbacks of these prior art systems are that, first, the double barrier containment tanks are quite complex in construction, and, second, also, in view of the materials used, these tanks are very expensive.

A further difficulty associated with the marine transportation of cryogenic fluids relates to the detection of leaks in the containment systems.

Still a further difficulty experienced by the prior art is that the double barrier construction of the containment tanks requires long periods of time for cooling. Also, the double barrier construction is potentially subject to excessive thermal stress during normal use. Additionally, most double barrier configurations do not lend themselves to hydrostatic testing nor are they easy to inspect or repair when required.

SUMMARY OF THE INVENTION

The present invention relates to a ship of simplified design which is useful in the marine transportation of cryogenic materials. The ship of the present invention is equipped with a double barrier containment system, but employs only a single wall containment tank. A secondary barrier is provided by means of a flexible liquid and gas impervious liner which covers a thermal insulation system appended to the inboard wall of the inner hull. Therefore, the single barrier containment tank serves as a primary barrier and the flexible liner serves as a non-structural secondary barrier.

There is a constant threat that a hull leak, or a leak from a ballast tank, may reveal itself. Since the insulation system on the inner hull is important in isolating, from the hull, the low temperatures associated with the transported material, and since the insulation would lose its effectiveness if impregnated with water, protection of the insulation system from hull and ballast tank leaks is paramount. This threat of leakage is met in a novel way by the present invention by providing outboard of the inner hull a unique cofferdam system.

The cofferdam system serves functions other than that noted above. By circulating gas (inert gas or air) within the spaces of the cofferdam system, detection is possible of the presence of the material transported by the ship resulting from leaks in the flexible liner and inner hull bulkheads. Further, the cofferdam system and its circulating system serve to maintain the transverse bulkheads separating each containment tank from its neighbor tanks at relatively elevated temperatures. This is desirable since the transverse bulkheads tend to become quite cold due to their isolated location and proximity with the temperature of the transported material. The hulls, the floor and the deck are located in good proximity to the external environment relative to the cold transported material and hence do not experience this difficulty. Thus, by circulating a gas, such as air or inert gas, through the cofferdam spaces, the transverse bulkheads of the ship are maintained at safe temperatures, those above which structural weakness will occur.

Intermediate the non-structural secondary barrier and the primary barrier is a barrier space. This space serves numerous functions. First, it serves as part of a leak detection system. Further, a gas circulation system coupled to the barrier space maintains the single wall of the tank at a relatively uniform temperature, avoiding severe thermal stress on the tank wall both during the loaded and the unloaded legs of the voyage. Additionally, the space between the tank and the liner is available for access to the primary and secondary barriers for purposes of inspection, repair, or other desirable operations.

The primary object of the invention is to provide a simplified ship for the marine transportation of cryogenic materials, the ship being equipped with at least one single barrier containment tank serving as a primary barrier and a non-structural liner, carried on the inner hull of the ship, serving as a secondary barrier.

Another object of the invention is to insulate the hull of a ship from the cryogenic temperature of the transported material and to ensure the integrity of insulation by means of a cofferdam system.

A further object of the invention is to detect leaks in the void spaces of the ship.

Another object of the invention is to maintain the transverse bulkheads above the temperature at which brittleness occurs.

A further object of the invention is to maintain the containment tank at a relatively uniform temperature, thereby avoiding excessive thermal stress.

These and other objects of the invention, as well as many of the attendant advantages that flow therefrom, will become more readily apparent when reference is made to the following detailed description of a preferred embodiment of the invention when taken in conjunction with the accompanying drawings.

BRIEF DESCRIPTION OF THE DRAWINGS

FIG. 2 shows a top plan view of the ship illustrated in FIG. 1.

DETAILED DESCRIPTION OF THE INVENTION

Figure 1:
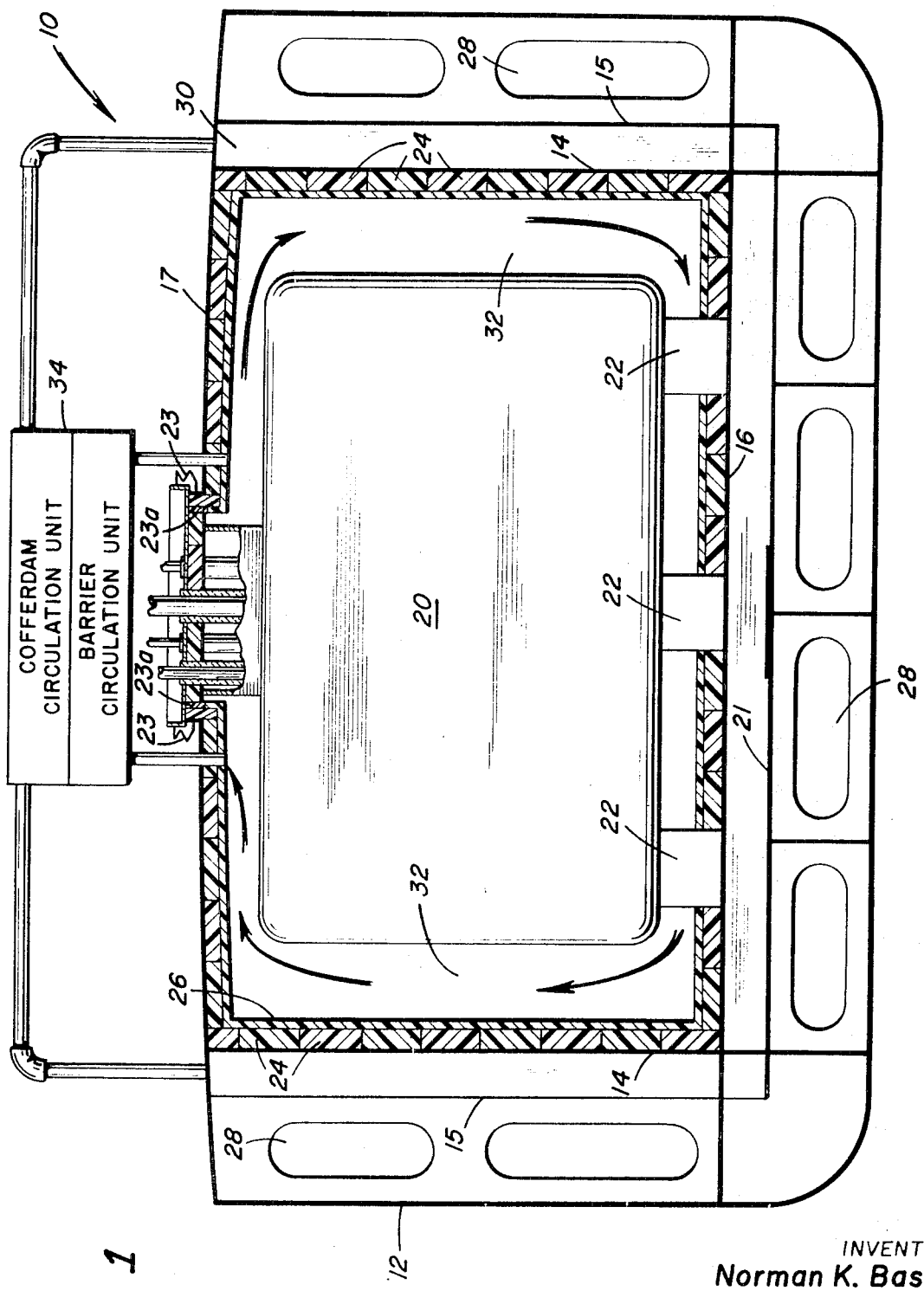
FIG. 1 shows a cross-sectional view of a ship constructed in accordance with the present invention.

With reference to FIGS. 1 and 2, a ship constructed in accordance with the teachings of the present invention is shown generally at 10 and comprises: an outer hull 12, an inner hull 14, an inner bottom 16, a deck structure 17, and a plurality of transverse bulkheads 18. Within each of select holds of the ship 10, there is located a containment tank 20 constructed of a material able to withstand the temperatures associated with the cryogenic material housed therein. This tank may be, for example, of nickel-steel or aluminum alloy. Each tank 20 rests, in a well-known manner, on foundation blocks 22 which support the tank above the inner bottom 16 of the ship 10. Each tank is restrained within the ship and permitted to expand about a fixed point at its bottom by the use of conventional restraining keys and chocks (not shown).

The trunk at the top of each tank 20 is closed by an insulated hatch cover fixed thereto with the hatch cover being sealed to deck structure 17 by means of a conventional liquid and gas impervious expansion joint 23.

Entirely surrounding each containment tank 20 is an insulation system serving to insulate the inner hull 14 from the extreme cold associated with the cryogenic cargo. This insulating system comprises a plurality of insulating blocks 24 which may be of any material suitable for insulating at cryogenic temperatures. An example of a suitable material is polyurethane foam. Inboard of the polyurethane block insulating system 24 is positioned a flexible liner 26 of any suitable material impervious to gas and liquid at cryogenic temperatures. An example of such a material is polyethylene. Since the polyurethane blocks 24 are supported by the inner hull 14 and since the polyethylene liner 26 is supported by the blocks 24, the secondary barrier to the cargo formed by the liner 26 is a non-structural barrier. The termination of insulation system 24 in the vicinity of each hatch is made by a Teflon strip 23a, for example, to afford a good sliding contact surface with the insulation carried by the hatch cover.

Outboard of the inner hull 14 and inner bottom 16 is a cofferdam system which isolates the insulation system 24. The cofferdam system is comprised of cofferdams 30 defined in the fore and aft direction by inner hull 14 and spaced bulkheads 15 and inner bottom 16, and spaced bulkheads 21; and in the transverse direction by transverse bulkheads 18 and spaced bulkheads 19. Transverse bulkheads 18 and 19 provide the vessel with the necessary transverse strength and torsional rigidity. Outboard of the cofferdams 30, defined in the fore and aft direction, are ballast tanks 28. The cofferdams 30 serve to isolate the insulation on the inner hull and inner bottom structures from sources of water (ballast tanks), which in normal constructions would include inner hull 14 and inner bottom 16 as the inboard boundaries of the ballast tanks and thereby would expose the insulation system to potential damage should the inner hull 14 or inner bottom 16 develop a leak.

The insulation system 24 is mounted slightly differently for adjacent cargo tanks. Note, in this regard, FIG. 2, which shows adjacent cargo tanks 20a and 20b. The cargo hold for tank 20b is defined by transverse bulkheads 18, and the insulation system 24 is mounted thereon. The insulation system 24 for tank 20a is mounted on the spaced transverse bulkheads 19 which define the transverse cofferdams in conjunction with transverse bulkheads 18. The corners of the transverse and longitudinal cofferdams 30 surrounding the tank 20a are cut out for communication as indicated at 31 to allow gas circulation through the longitudinal cofferdams 30 and associated transverse cofferdams 30, thereby establishing circulation of gas throughout the cofferdam system about tank 20a in a horizontal sense. With respect to tank 20b, which is located in the cargo hold defined by transverse bulkheads 18, the longitudinal cofferdams 30 effect a circulation of gas about the tank 20b, but only in a vertical sense. Thus, it is apparent that the transverse cofferdams 30 are part of the cofferdam circulation system surrounding tank 20a (alternate tanks 20), but have no counterpart in the cofferdam circulation system surrounding tank 20b. Hence, the cofferdam circulation system surrounding 20a enables circulation in both a horizontal and vertical sense, whereas the cofferdam circulation system surrounding tank 20b provides only for circulation in a vertical sense. The cofferdam circulation system associated with tank 20a also acts to warm the transverse bulkheads 18 and the spaced bulkheads 19 by heat transfer that takes place between the longitudinal and transverse cofferdams 30.

Several purposes are served by circulation of gas in the cofferdam system. As already noted, circulation in the horizontal sense (tank 20a) will insure against the transverse bulkheads 18 and 19 being subjected to dangerously low temperatures. Heat will be picked up in the fore and aft cofferdams 30, transferred to the transverse cofferdams 30, and imparted to the transverse bulkheads 18 and 19. The fore and aft cofferdams are in proximity with the heat sink provided by the sea; whereas, the transverse bulkheads 18 and 19 lack proper proximity with the heat sink of the sea, being somewhat isolated therefrom and being more closely associated with the cargo tanks 20. A further purpose for the circulation in the cofferdam system is to add heat to the cofferdam space to protect hull steel in the event of extremely low outside temperature. Further, the circulation system enables detection of gas leakage in the event there is an unlikely rupture of liner 26 and the inner hull, or one of the transverse bulkheads. Leaks can be detected by pressure buildup or by virtue of gas sensors should the gas medium in the cofferdam system be different from that in barrier space 32, immediately surrounding each tank 20. Also, the cofferdam circulation system enables a dry atmosphere to be maintained in the cofferdam void spaces to preclude corrosion of the steel forming the cofferdams, and accordingly, can detect water leaks from the ballast tanks 28 to cofferdams 30 by, for example, the use of a humidistat installed in this gas stream.

As already noted, a barrier space 32 surrounds each tank 20 and extends from the outer surface of the tank 20 to the liner 26 forming the non-structural secondary barrier. This barrier space is of the order of at least 2 feet in width to enable access to, and inspection of, the outer surface of the tanks 20 and the liner 26, and its associated insulation system 24.

As will be noted in FIG. 1, an individual circulation unit is provided for the cofferdam system and the barrier space 32. These two independent circulation units have been generally designated by the numeral 34.

The barrier circulation system serves—at varying times—the functions of inerting the barrier space 32, air flushing the barrier space 32, cooling the tank 20 and its associated insulation system 24 by cooling the medium being circulated through the barrier space. Mediums suitable for circulation through the barrier space 32 should be inert, that is, not contain any oxygen, and may be pure cargo gas, nitrogen, or a mixture of such inert gases as would be obtained from the uptake of the propulsion plant. The barrier circulation system also serves to maintain a uniform temperature of the tank during the unloaded portion of the voyage when only a small quantity of liquid remains on the bottom of the cargo tank. Under these conditions, unfavorable thermal stress levels are likely to be experienced in the top of the tank 20 due to the thermal gradient. The barrier circulation system minimizes these thermal stresses by forced convection heat transfer to reduce with acceptable limits the thermal gradient across the tank in a vertical sense. The barrier circulation system also serves to warm the tank 20 through heating of the circulated medium at such times when it is desired to inspect or make repairs. Further, the barrier circulation system provides a dry atmosphere in the barrier space 32 to minimize corrosion of exposed steel.

A ship for the transportation of cryogenic materials is provided by the present invention which is of extremely simplified construction and which makes possible use of a single wall containment tank. This unique result is achieved because the inner hull and bottom of the ship support a non-structural insulation system and secondary barrier, and are surrounded by a novel cofferdam system. Separate circulation systems are used for the cofferdam system and the barrier space defined between the single wall tank and the non-structural secondary barrier.

While the present invention has been described with reference to a particular embodiment, it should be understood that numerous alterations and modifications may be perfected without departing from the spirit and scope of the invention. It is contemplated, therefore, that the invention not be limited to the above, but only be limited as defined in the appended claims.

WHAT IS CLAIMED IS:

1. A ship for the transportation of cryogenic materials and comprising: an outer hull; an inner hull; an outer bottom; and an inner bottom; transverse bulkheads dividing the interior of said inner hull into a plurality of cargo holds; a single barrier containment tank positioned within each said cargo hold in spaced relation to the boundaries thereof; an insulation system carried on the cargo hold boundaries substantially surrounding the containment tank positioned therein; a non-structural liquid and gas impervious liner, serving as a secondary barrier, carried by said insulation system substantially surrounding the containment tank and defining therewith a barrier space; and a cofferdam system outboard of and surrounding said inner hull and said inner bottom and positioned between adjacent tanks, the portion of said cofferdam system associated with the inner hull and the inner bottom serving as a double barrier preventing the passage of sea water and ballast liquid into the insulation system, and the portion of the cofferdam system positioned between adjacent tanks serving to enable heat transfer to said transverse bulkheads.

2. The ship as set forth in claim 1, further comprising means for circulating a gas within said cofferdam system.

3. The ship as set forth in claim 1, further comprising circulation means for circulating a gas in said barrier space.

4. The ship as set forth in claim 2, further comprising said cofferdam system providing for circulation of gas around alternate tanks in a horizontal sense.

5. The ship as set forth in claim 1, further comprising leak detection means for detecting presence of cargo in said barrier space.

6. The ship as set forth in claim 1, further comprising leak detection means for detecting presence of cargo and/or water in said cofferdam system.

7. A ship for transporting cryogenic materials comprising: an outer hull; an inner hull; an outer bottom; an inner bottom; a deck structure; a plurality of transverse bulkheads forming a plurality of holds within the inner hull of the ship; a plurality of single wall containment tanks, each positioned within a respective hold; and insulating system substantially surrounding each of said containment tanks; a non-structural gas and liquid impervious liner substantially surrounding each of said containment tanks and positioned on said insulating system; a barrier space intermediate said liner and said containment tank, and substantially surrounding said containment tank; and a cofferdam system surrounding and isolating said insulation systems from sea water and ballast liquid and comprising in part longitudinal walls positioned outboard of said inner hull, bottom walls positioned outboard of said inner bottom and transverse walls adjacent said transverse bulkheads.

8. The ship as recited in claim 7, further comprising: first circulation means for circulating a gas through said cofferdam system; and second circulation means for circulating a gas through each of said barrier spaces.

9. The ship as recited in claim 7, wherein the insulation system associated with each tank is positioned on said inner hull, said inner bottom, said deck and one of said transverse bulkheads and transverse walls.

10. The ship as recited in claim 7 and further comprising means for detecting presence of cargo in said barrier space.

11. The ship as recited in claim 7, further comprising means for detecting presence of cargo and/or water in said cofferdam system.

* * * * *